United States Patent [19]

Klotz

[11] 4,287,679
[45] Sep. 8, 1981

[54] ARTIFICIAL MINNOW BAIT WITH SWINGING KEEL WEIGHT

[76] Inventor: Al Klotz, 131 Dover La., Boise, Id. 83705

[21] Appl. No.: 113,077

[22] Filed: Jan. 17, 1980

[51] Int. Cl.³ .............................................. A01K 85/00
[52] U.S. Cl. ................................. 43/42.09; 43/42.22; 43/42.31; 43/42.39
[58] Field of Search ................. 43/42.31, 42.09, 42.22, 43/42.39, 42.45, 42.47, 42.48, 43.13, 43.14

[56] References Cited

U.S. PATENT DOCUMENTS

| 1,857,939 | 5/1932 | Cameron | 43/42.39 X |
|---|---|---|---|
| 2,228,591 | 1/1941 | Brown | 43/42.09 |
| 2,306,692 | 12/1942 | Flood | 43/42.39 X |
| 2,574,293 | 11/1951 | Sabin | 43/42.09 |
| 2,755,593 | 7/1956 | Thurman | 43/42.39 X |
| 3,123,932 | 3/1964 | Austin | 43/42.09 |
| 4,155,191 | 5/1979 | Spivey | 43/42.39 X |

FOREIGN PATENT DOCUMENTS

| 586570 | 11/1959 | Canada | 43/42.39 |
|---|---|---|---|
| 1511818 | 2/1967 | France | 43/42.39 |

Primary Examiner—Stephen G. Kunin
Assistant Examiner—K. Bradford Adolphson
Attorney, Agent, or Firm—Littlepage & Webner

[57] ABSTRACT

A laterally swinging keel weight is supported within a recess of the belly of a buoyant minnow so as to swing about an axis disposed above the longitudinal center of buoyancy of the minnow.

2 Claims, 3 Drawing Figures

ARTIFICIAL MINNOW BAIT WITH SWINGING KEEL WEIGHT

FIELD OF INVENTION

Fishing, Trapping and Vermin Destroying, Artificial Bait, Ornamental, Weighted

PRIOR ART

Cameron: U.S. Pat. No. 1,857,939
Thurman: U.S. Pat. No. 2,755,593

OBJECTS

Artificial minnow baits with fixed keel weights have heretofore been devised, but because the keel weights are fixed or otherwise mounted so as to tend to maintain the minnow upright, the action of the lure is sluggish. The object now is to provide a buoyant minnow lure with a laterally-swinging keel weight suspended from its belly so that the minnow body portrays a lively natural motion as it is drawn through the water.

A more specific object is to provide a buoyant minnow lure with a pivoted keel weight suspended from the minnow body for swinging about a pivotal axis which extends longitudinally of the minnow body and which axis is disposed above the center buoyance of the minnow body.

Still another object is to provide a buoyant minnow lure having a pivoted keel weight disposed in a recess in the underside of the minnow belly so that it does not tend to catch on grass or roots.

In addition to the above objectives, it is intended to provide a releasable suspension for a keel weight so that different size weights can be interchanged.

Figure 1:
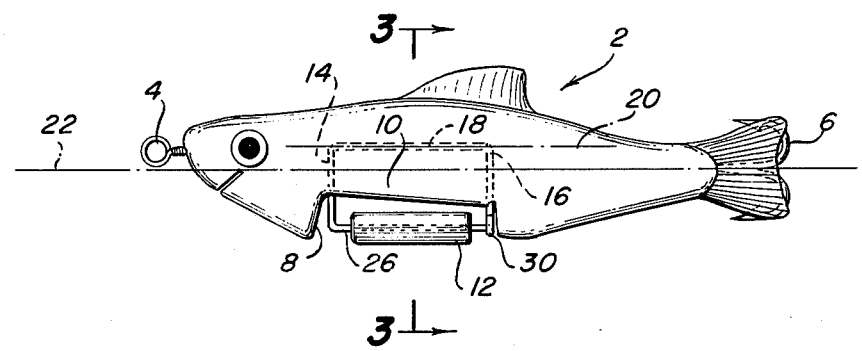
Figure 2:
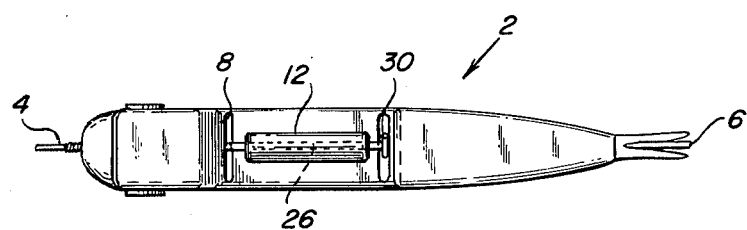
Figure 3:
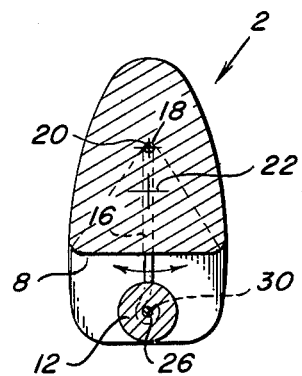

These and other objects will be apparent from the following specification and drawing, in which:

FIG. 1 is a side elevational view;
FIG. 2 is a bottom plan view; and
FIG. 3 is an enlarged sectional view taken on lines 3—3 of FIG. 1.

Referring now to the drawing, the buoyant minnow body 2 has a line attachment 4 at its front end and hooks 6 in the tail end. Within a recess 8 in the belly 10 of the minnow a keel weight 12 is suspended by arms 14 and 16 from a pivot 18 in the upper portion of the minnow body. The pivotal axis 20 of the minnow extends longitudinally of the body and is disposed above the center of buoyancy 22 of the minnow body. Keel weight 12, which may be a conventional lead sinker with a hole running longitudinally therethrough is loosely mounted on the bend over bottom end 26 of arm 14, the latter being caught in a loop 30 on the lower end of arm 16 so that keel weights of various weight can be interchanged. If desired, diving scoops or fins can be mounted on the minnow body, preferably on the front end.

In operation, as the lure is drawn through the water, the keel weight tends to hang straight down, but because the pivotal axis of its suspension is disposed above the center of buoyancy of the minnow, the minnow body swings back and forth, to one side and then the other, with some degree of freedom of motion with respect to the weight.

The disposition of the keel weight should be at or near the mid region as considered in the fore-and-aft direction of the minnow body, and because of the disposition of the minnow body, and because of the disposition of the keel weight or least the major portion thereof within the recess in the minnow belly, the weight does not tend to catch on grass, seaweed or roots as the lure is drawn through the water.

I claim:

1. An artificial minnow lure comprising:
    an elongated buoyant body having spaced head and tail portions and back and belly portions disposed there-between, said belly portion having a recess therein;
    a keel weight;
    pivot means, having a pivotal axis, for suspending the keel weight substantially within said recess for side-to-side swinging movement of said keel weight about said pivotal axis of said pivot means which extends lengthwise of the body; and
    said body having a center of buoyancy which is disposed generally at the juncture of the belly and back portions, said pivotal axis being disposed above said center of buoyancy.

2. An artificial minnow as claimed in claim 1, said keel weight comprising an elongate body having a bore extending longitudinally therethrough, said pivot means including normally closed generally rectangular loop of wire having upper and lower sides extending lengthwise of the minnow body, the lower side of said loop extending through the bore and said keel weight body.

* * * * *